May 24, 1927.
L. PONDELICK
DIFFERENTIAL GEARING
Filed May 22, 1922
1,629,527
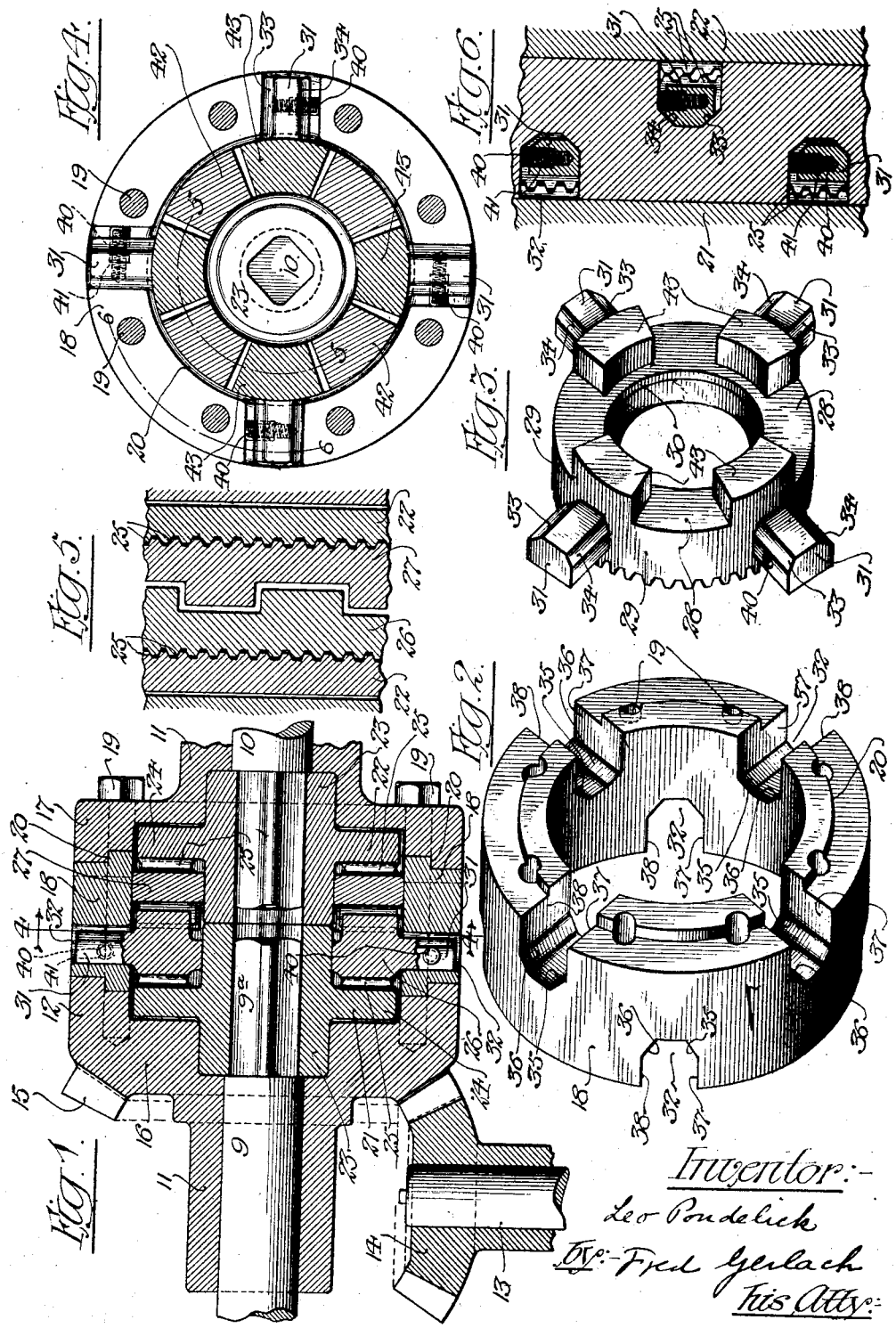
Inventor:-
Leo Pondelick
By: Fred Gerlach
His Atty:

Patented May 24, 1927.

1,629,527

UNITED STATES PATENT OFFICE.

LEO PONDELICK, OF CHICAGO, ILLINOIS.

DIFFERENTIAL GEARING.

Application filed May 22, 1922. Serial No. 562,573.

The invention relates to differential gearing of that type in which the axle members are positively driven under normal conditions with the provision for releasing one member when it is necessary for the wheels to travel at differential speed.

One object of the invention is to provide differential gearing of this type which comprises separate elements rotating with the drum for driving the axle members respectively.

Another object of the invention is to provide a construction by which excessive stresses will be avoided between the clutch-teeth which are used to drive the axle-members and are formed to automatically disengage when the clutch-member is driven at a speed in excess of the drum by one of the traction-wheels.

A still further object of the invention is to provide differential gearing which is efficient in operation, simple in construction and can be produced at a low cost.

The invention consists in the several novel features hereinafter set forth and more particularly defined by claims at the conclusion hereof.

In the drawings: Fig. 1 is an axial section of differential gearing embodying the invention. Fig. 2 is a perspective of the ring forming the body of the differential drum. Fig. 3 is a perspective of one of the clutch-members which have constant driving relation with the drum. Fig. 4 is a section on line 4—4 of Fig. 1. Fig. 5 is a developed section on line 5—5 of Fig. 4. Fig. 6 is a developed section on line 6—6 of Fig. 4.

The invention is exemplified in gearing for driving axle sections or members 9 and 10 which have their outer ends positively connected to the traction-wheels of a power-driven vehicle. These axle members are coaxial and their inner ends extend respectively through hubs 11 of a differential drum 12 which is connected to be driven from a suitable source of power by a shaft 13 and a pinion 14 keyed to said shaft and meshing with gear-teeth 15 integral with one side of the drum. The latter is composed of a head 16 forming one side of the drum, a head 17 forming the other side of the drum and an intermediate or ring-member 18 forming the body of the drum. Heads 16 and 17 and ring 18 are rigidly secured together by bolts 19. The contiguous faces of the heads and body of the drum are formed with interfitting portions, as at 20, to lock them against relative radial movement.

A clutch-member 21 is disposed in the drum and held on a polygonal portion 9ª of axle-member 9 so as to rotate therewith and a corresponding clutch-member 22 is similarly connected to the axle-member 10. Each of the clutch-members 21 and 22 comprises a hub 23 and a flange 24 provided with inwardly facing clutch-teeth 25 on its inner face. These clutch-members are rotatable in the drum and are held therein against endwise movement. Clutch-members 21 and 22 are adapted to be separately driven from the drum by the driving-members 26 and 27 respectively. Each of the driving members 26 and 27 comprises a ring-like body 28 having its outer periphery 29 fitting in and carried by the inner periphery of the drum-body 18 and its inner periphery 30 fitting around and furnishing a bearing for the inner end of the hub of one of the clutch-members 21, 22, a series of radial studs or arms 31 projecting into a corresponding series of slots 32 in the drum-body 18. The slots 32 for the studs 31 of driving member 26 are formed in one side of the drum-ring 18 and the slots for the studs 31 of the driving-member 27 are formed in the other face of said ring and these slots are relatively offset or staggered to avoid excessive weakening of the body. Each stud 31 is provided with inclined or cam surfaces 33 and 34 which are adapted to be acted upon by the inclined surfaces 35 and 36 respectively of one of the slots 32 in the drum-body to shift a driving member axially into and out of driving engagement with one of the clutch-members 21 and 22. Slots 32 are formed to permit sufficient axial movement of the driving members to permit the teeth on the driving members 26 and 27 to pass into and out of engagement with the teeth on the driven clutch-members 21, 22 respectively. The faces 37 and 38 of slots 32 are flat and the contiguous faces of the studs 31 are similarly formed, so that when the clutch-members are in connected relation, there will be substantially no pressure in outward axial direction between the clutch-teeth on the driving and driven members respectively produced by the driving stresses. The inclined or cam surfaces between the slots 32 and the studs 31 are provided to shift the studs and driving members axially into and to retain them in connected relation with the driven members while power is being applied to drive the axles through the differential, either in forward or backward direction. The sides of the teeth between the driven clutch-members and the driving members are convergent or inclined, so that when the axle is rotated faster than the drum by one of the traction-wheels, the driving member will be forced inwardly and disengaged from its clutch-member rotating with the axle. When this occurs, the studs 31 are moved to a centralized position in slots 32 to cause the cam-surfaces between the slots and the studs to release one another and so that the studs will be free to be shifted axially inward by the teeth 25 on the driven member. Springs 40 are held in sockets 41 in the studs 31 and bear against one of the sides of the slots 32 to press the studs normally into position to cause the clutch-members to remain in connected relation in readiness for the vehicle to be driven in forward direction. To prevent the driven members 26 and 27 from being shifted into position to cause reengagement of the driving and driven clutch-members while they are driven faster than associated driving members by one of the traction-wheels, the inner faces of said members are provided with interfitting lugs 42 and 43 which are spaced apart to permit sufficient relative rotation for the studs of the released driving member to be held centrally in their slots 32 and to rotate with the drum. The interfitting lugs 42 and 43 are spaced apart axially sufficiently to permit the axial movement of the driving members 26 and 27 into and out of operative relation with the driven members and are also formed to limit the relative rotative movement of the driving members while the vehicle is being driven in either direction.

The operation of the gearing will be as follows: When power is applied to the drum and there is no occasion for differential travel of the traction-wheels and their axle members, the drum will rotate the driving members 26 and 27 and the latter will be held in clutched relation with the driven members 21 and 22 respectively by the action of cam-surfaces 35 of the slots 32 which engage the cam surfaces 33 on the studs 31 and force them outwardly a sufficient distance to cause the clutch-teeth between the driving and driven members to remain in mesh. When the studs have been shifted outwardly by these cam surfaces, the flat contiguous faces of the studs and slots will abut so that the driving will be effected by the pressure of these abutting surfaces, without outward pressure, although retaining the clutch-teeth between the driving and driven members in connected relation. If the vehicle is to be driven in reverse direction, the same result will follow by reason of the cam-surfaces at the opposite sides of the studs 31 and slots 32. In this operation, each driven member will be operated by one of the driving members independently of the other. In turning a corner, or whenever occasion arises for differential travel of the traction-wheels, the driving and driven members for one of the traction-wheels will remain in connected relation and the other traction-wheel, which will be the one travelling over the greatest arc, will be released from its driving member. The latter traction-wheel will operate its driving member at a higher speed than the drum is rotating and, as a result, the teeth 25 on the driven member for that wheel will initially rotate its driving member until the studs 31 on the latter will be centrally positioned in their slots 32, at which point they will be arrested by contact between the lugs 42 and 43 on the driving members respectively and the inclined teeth 25 on the driven-member for said wheel will force the teeth on its associated driving member inwardly to disengage it from the driven member, and thereupon, this driving member will rotate with the drum, the driven member remaining disconnected until the speed of the traction-wheel is reduced to correspond with the speed of the drum and the other traction wheel. Thereupon, the wedge surfaces between the drum and the studs will shift the inoperative driving member outwardly to reengage it with its clutch-member. Obviously, either of the clutches will act in this manner to automatically disengage the fast travelling traction-wheel from the driving mechanism and to automatically re-connect it thereto when its speed is decreased to that of the drum or other traction-wheel.

The invention exemplifies differential gearing which occupies little space and in which there are separate driving members and studs for the axle members respectively, in which the cam formations between the studs and the slots are such as to limit outward axial movement of the driving members to avoid axial pressure to force the clutch-teeth in engagement, which is positive in its operation and which can be produced at a low cost.

The invention is not to be understood as restricted to the details set forth since these may be modified within the scope of the appended claims, without departing from the spirit and scope of the invention.

Having thus described the invention, what I claim as new and desire to secure by Letters Patent, is:

1. In differential gearing, the combination of axle sections, clutch members fixed to rotate with said sections respectively, a driving drum, separate driving members adapted to engage with and for driving the clutch members respectively, and separate stud and slot driving connections between the drum and each of the driving members respectively, said stud and slot connections operating independently of each other and each connection comprising means for automatically shifting one of the driving members into and out of engagement with one of the clutch members independently of the other.

2. In differential gearing, the combination of axle sections, clutch members fixed to rotate with said sections respectively, a driving drum, separate driving members adapted to engage with and for driving the clutch members respectively, and separate driving connections between the drum and each of the driving members comprising outwardly extending studs on the driving members and slots for said studs in the drum, each connection comprising means for automatically shifting one of the driving members into and out of engagement with one of the clutch members.

3. In differential gearing, the combination of axle sections, driven members secured to rotate with the sections respectively, a driving drum, rings for driving the driven members, stud-and-slot connections between the rings and the drum having cam surfaces for shifting the rings axially and flat abutting driving surfaces operative when the rings and driven members are in connected relation to prevent outward axial pressure by said connections when they are in such relation.

4. In differential gearing, the combination of axial sections, driven members secured to rotate with the sections respectively, a drum, means for driving the drum, said drum comprising heads and an annular ring-like body rigidly secured together, means for driving the driven members comprising rings provided with studs, the annular body being provided with end slots for said studs, and cam surfaces between said studs and said slots.

5. In differential gearing, the combination of axial sections, driven members secured to rotate with the sections respectively, a drum, means for driving the drum, said drum comprising heads and an annular ring-like body rigidly secured together, means for driving the driven members comprising rings provided with studs, an interfitting connection between the rings, the annular member being provided with end slots for said studs, and cam surfaces between said studs and said slots.

6. In differential gearing, the combination of axle sections, clutch members secured to rotate with the sections respectively, a driving drum, a ring for driving one of the clutch members, a stud-and-slot connection having cam-surfaces for shifting the ring axially, and spring means to rotate the ring normally into position to cause it to mesh with its clutch-member when the gearing is idle.

7. In differential gearing, the combination of axle sections, clutch-members secured to rotate with the sections respectively, a driving drum, a ring for driving one of the clutch-members, a stud-and-slot connection comprising a stud on the ring and a slot in the drum having cam-surfaces for shifting the ring axially, and a spring between the stud and the drum tending to rotate the ring normally into position to cause it to engage its clutch-member when the gearing is idle.

Signed at Chicago, Illinois, this 8th day of May, 1922.

LEO PONDELICK.